Dec. 19, 1967 M. RUDERFER ETAL 3,358,405
GRINDING MACHINE CONTROL

Filed Dec. 18, 1964 2 Sheets-Sheet 1

INVENTORS
Philip Ohringer
Martin Ruderfer
BY
*Pennie Edmonds Morton Taylor & Adams*
ATTORNEYS

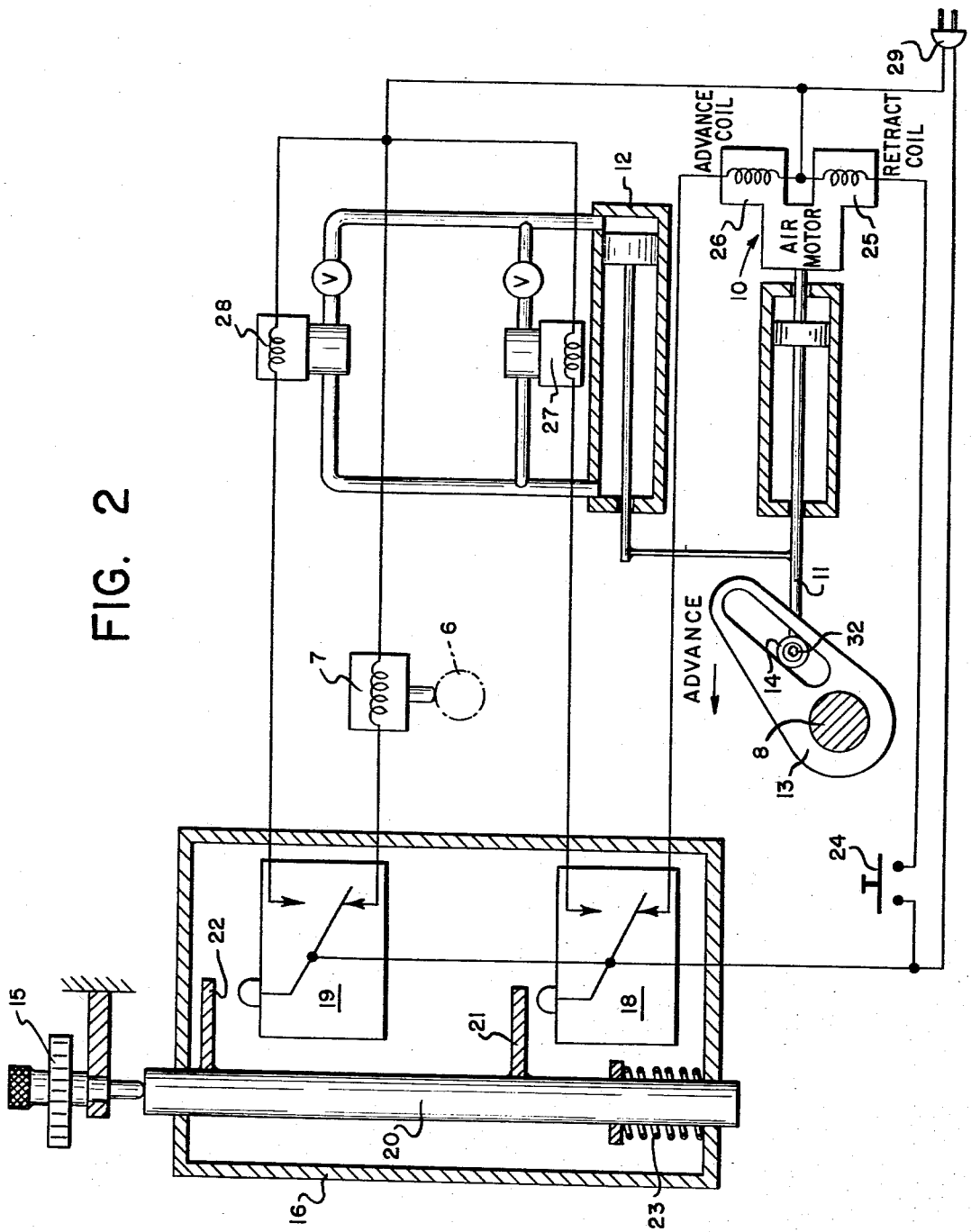

United States Patent Office 3,358,405
Patented Dec. 19, 1967

3,358,405
GRINDING MACHINE CONTROL
Martin Ruderfer, Hempstead, and Philip Ohringer, Commack, N.Y. (both of 95 Madison Ave., Hempstead, N.Y. 11550)
Filed Dec. 18, 1964, Ser. No. 419,534
2 Claims. (Cl. 51—103)

ABSTRACT OF THE DISCLOSURE

The disclosure shows a method and apparatus for controlling a centerless throughfeed grinding machine and for correcting grinding wheel breakdown in such a machine. The apparatus provides for retracting the regulating wheel of the grinder away from a series of moving workpieces, and a first grinding position, halting the movement of the workpieces, automatically advancing the regulating wheel back toward the workpieces, restarting the movement of the workpieces, and halting the regulating wheel at a second grinding position.

---

This invention relates to grinding machines and more particularly to apparatus for controlling a centerless grinding machine for throughfeed operation.

The centerless grinding machine is a frequently employed means for fashioning cylindrical precision-sized parts. Such a grinder conventionally has a rotating grinding wheel mounted on a machine bed; a regulating wheel mounted on a moveable slide; and a workrest blade mounted between the grinding wheel and regulating wheel. In operation workpieces or parts to be ground are placed on the workrest blade and the regulating wheel is moved on its slide toward the grinding wheel a sufficient distance to force the workpiece against the grinding wheel. The precise positioning of the regulating wheel is essential if the workpiece is to be ground to a precisely determined dimension. In the throughfeed grinding operation to which this invention relates, workpieces are continuously fed onto the workrest and are ground in continuous succession between the grinding wheel and regulating wheel. The axes of the grinding and regulating wheels are slightly skewed to create a forward thrust on the workpieces during the grinding process. In some cases this thrust is the primary force which keeps the workpieces moving through the grinder. If the regulating wheel is retracted away from the workpieces the forward thrust ceases and the workpieces remain in position. In other cases gravity or power feed is used to move the workpieces along the workrest blade. In these cases a positive means is required to stop the flow of workpieces when desired.

Throughfeed grinding is to be distinguished from the so-called infeed grinding process where workpieces or portions of workpieces are individually ground one at a time with the regulating wheel being repositioned for the grinding of each workpiece. In throughfeed grinding the regulating wheel is initially positioned and this position is normally not changed as the workpieces move continually through the grinder.

As the series of workpieces is ground in this manner the grinding wheel gradually wears and its diameter decreases, causing the finished part dimension to increase. One of the major problems in centerless throughfeed grinding is the correction of this grinding wheel wear, or wheel breakdown, as it is termed in the industry. In addition to wear, other factors such as heat may produce changes in final part size. This invention provides an improved means for correcting for wheel breakdown and other causes of variation in final part size in centerless throughfeed grinding.

The present invention also provides apparatus for quickly disconnecting a power feed driving means from a grinding machine to permit a rapid and convenient changeover from a power drive to a manually controlled operation.

Centerless grinders are equipped with a handle or hand wheel by means of which an operator can move the regulating wheel on its slide toward or away from the grinding wheel. As wheel breakdown occurs and the finished part size is observed to approach a maximum tolerance value it is necessary to reposition the regulating wheel relative to the grinding wheel. This is customarily done manually by turning the hand wheel slightly or by tapping the slide on which the regulating wheel is mounted. This is often a troublesome procedure, especially when very small corrections have to be made reliably and quickly. Moreover, it has been found that the phenomenon of static friction prevents the reliable and controllable movement of the regulating wheel on its slide through very small distances such as 20 or 30 millionths of an inch which are frequently required for precision wheel breakdown correction.

Automatic power feeds have been attached to centerless throughfeed grinders to move the regulating wheel back and forth on its slide. These power feeds have been inconvenient for converting to manual infeed operation. By this invention it is quite easy to convert from throughfeed to infeed operation and vice versa.

The present invention provides an apparatus for overcoming the undesirable and unpredictable effects of static friction in correcting for grinding wheel breakdown in a centerless throughfeed grinder equipped with a power feed. The apparatus for correcting for wheel breakdown comprises the means for retracting the regulating wheel away from the series of workpieces, and a first grinding position, means for automatically advancing the regulating wheel back toward the workpieces and means for halting the regulating wheel at a second grinding position determined by an adjustable positioning means.

These and further objects and advantages of the present invention will be more readily understood when the following description is read in connection with the accompanying drawing in which:

FIGURE 2 is a schematic diagram of the electrical control system for the grinder.

Figure 1:
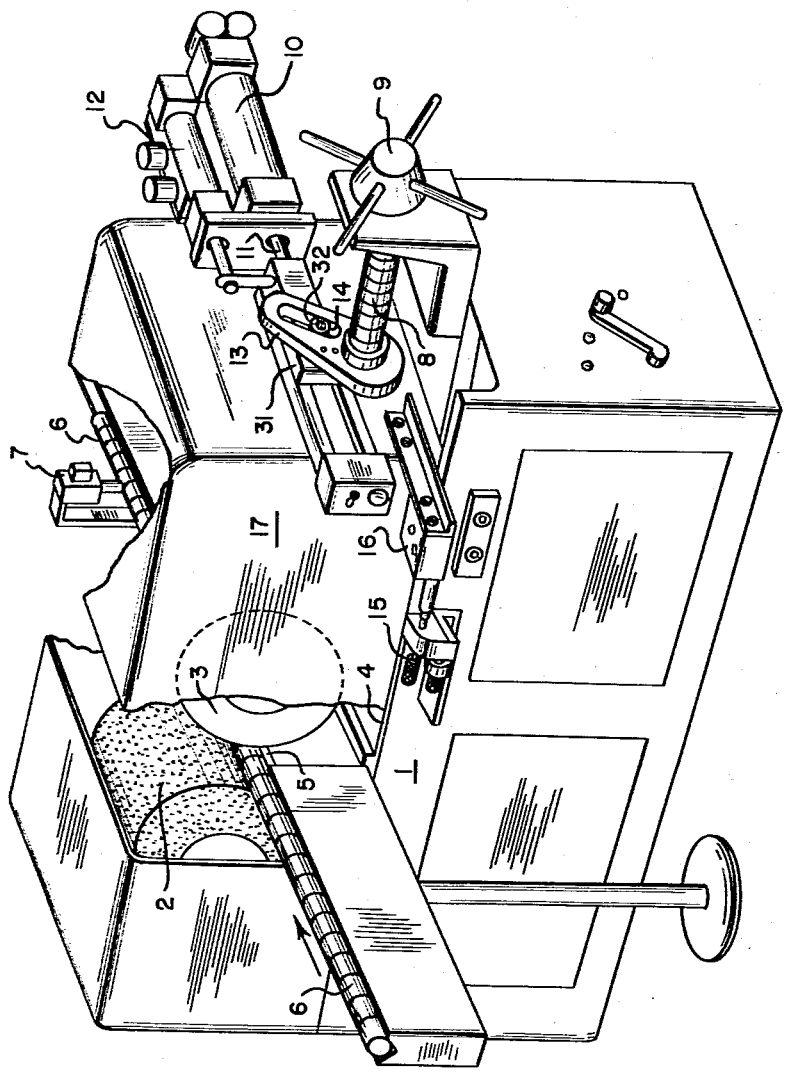
FIGURE 1 is a perspective view of a centerless throughfeed grinder.

The centerless throughfeed grinder of FIG. 1 comprises a machine bed 1 on which is mounted a grinding wheel 2. A regulating wheel 3 is mounted on a slide 4 and is capable of moving toward or away from the grinding wheel 2. Between wheels 2 and 3 is positioned a workrest blade 5 which supports a series of workpieces 6. The workpieces 6 are normally moved along the workrest blade by means of a gravity or power feed mechanism not shown. A solenoid operated clamp 7 is mounted over the workpieces and when energized it is capable of clamping a workpiece to the workrest blade and halting the flow of workpieces.

The regulating wheel 3 can be moved forward or backward on its slide by means of a lead screw 8 which can be turned by a handwheel 9. The grinder of FIG. 1 is also equipped with a power feed mechanism for turning this lead screw 8 to move the regulating wheel back and forth. The power feed comprises an air motor 10 capable of moving rod 11 in and out of the air motor cylinder. Coupled to rod 11 is an hydraulic check cylinder 12 capable of slowing or stopping the motion of rod 11. A cam 13 is rigidly attached to the lead screw 8 and the rod 11 is connected to the cam 13 by means of a cam follower 14. The connection of the power feed to the grinder seriously interferes with the manual use of the grinder for precision infeed grinding operations. Although the lead screw 8 may be rotated manually, the drag of the air motor 10, hydraulic check 12 and their associated mechanism remains to hamper convenient manual infeed control.

To permit quickly disconnecting and reconnecting the power feed, the cam follower 14 is made removable as shown in FIGURE 1. A threaded hole in the power feed slide 31 connected to rod 11 permits mounting cam follower 14 with a bolt 32. Removal of the bolt 32 and cam follower 14 completely disconnects the cam 13 from the rest of the power feed and permits the manual rotation of the lead screw 8 without the drag of the power feed. Installation of heavy duty power feed on grinder machines has heretofore been objectionable because the drag associated with such power feeds has discouraged the use of manual infeed operation for many jobs. The addition of this quick disconnect feature is particularly advantageous in shops having limited facilities since it greatly enlarges the range of applications for a grinding machine with power feed. The feature is also of great utility on the occasion of power feed failure.

An adjustable stop 15 is mounted on the machine bed 1. Stop 15 is a precision micrometer the positioning of which may be varied millionths of an inch by turning its adjustment dial. A switchbox 16 is mounted on the regulating wheel frame 17 so as to be in alignment with the adjustable stop 15. The position of the regulating wheel is adjustably controlled by the setting of the stop 15 in the manner to be described:

Stop 15 and switchbox 16 are shown in more detail in FIG. 2. Switchbox 16 contains two single pole-double throw switches 18 and 19, which are actuated by the movement of actuating rod 20 having protrusions 21 and 22. Rod 20 is urged outwardly from the box by spring 23.

When the regulating wheel 3 is advanced toward the grinder wheel 2 switchbox 16 moves similarly toward adjustable stop 15. As wheel 3 is advanced there comes a point where stop 15 contacts actuating rod 20 and further motion of wheel 3 pushes rod 20 against its spring 23. Protrusions 21 and 22 are positioned so that as the actuating rod 20 is thus impelled switch 18 is actuated before switch 19 is actuated. When switches 18 and 19 are not actuated by the protrusions 21 and 22 they are in the positions illustrated in FIG. 2.

The switching arm terminals of switches 18 and 19 are connected together and then through a pushbutton switch 24 to one side of retract coil 25 associated with air motor 10. When coil 25 is energized the air motor causes the regulating wheel to retract away from the grinding wheel. A first terminal of switch 18 is connected to advance coil 26, the energization of which moves the regulating wheel toward the grinding wheel. A second terminal of switch 18 is connected to solenoid valve 27 associated with the hydraulic check 12. When solenoid valve 27 is energized it closes one of the hydraulic circulation paths of 12 thereby loading and slowing the motion of rod 11. A first terminal of switch 19 is connected to the solenoid clamp 7 described above. A second terminal of switch 19 is connected to solenoid valve 28 which when energized closes a circulating path of the hydraulic check 12. When both valves 27 and 28 are energized both circulating paths are closed and the fluid of the hydraulic check cannot circulate from one side of the hydraulic check piston to the other. Under such conditions the hydraulic check is locked in position and since it is connected to rod 11 locks the position of the lead screw 8 and thus regulating wheel 3. The arm terminals of switches 18 and 19 are also connected to one side of an A.C. power line 29. The other side of the power line is connected ot the solenoid clamp 7, coils 25 and 26, and valves 27 and 28.

In normal throughfeed grinding operation the regulating wheel 3 is advanced by means of the air motor 10 toward the grinder wheel 2 until actuating rod 20 contacts adjustable stop 15. As the regulating wheel continues to advance actuating rod 20 moves against its spring 23 and first switch 18 is actuated to the position opposite that shown in FIG. 2, energizing valve 27 and slowing the advance of the wheel 3. As the advance continues switch 19 is next actuated to close valve 28 and halt the advance of the regulating wheel 2. The position at which the wheel 3 is halted depends upon the position to which the micrometrically adjustable stop 15 is brought.

Correction for wheel breakdown using the present invention is made as follows. When the dimensions of the finished workpieces are observed to approach an upper tolerance value due to the effect of wheel breakdown the operator of the grinder initiates the correction process by making an appropriate adjustment in the setting of stop 15 and depressing pushbutton switch 24. This action energizes retract coil 25 to move the regulating wheel 3 away from the grinder wheel 2 and workpieces 6. As the wheel 3 retracts, switchbox 16 and actuating rod 20 move away from stop 15. Under the urging of spring 23 rod 20 moves outward causing switch 19 to be actuated to the position shown in FIG. 2, opening valve 28, energizing solenoid clamp 7 and halting the movement of workpieces 6. If the workpieces are moved along the workrest blade 5 solely by the thrust caused by the slight skew between the axes of the grinding and regulating wheels then the workpieces will halt as soon as the regulating wheel 3 retracts and the solenoid clamp 7 would be unnecessary.

As the rod 20 continues its outward movement switch 18 is next actuated to the position shown in FIG. 2, opening valve 27 and energizing advance coil 26 to cause the regulating wheel 3 to start back toward the workpieces. The regulating wheel 3 is halted at its new corrected position by the normal action of stop 15 and switchbox 16.

This method of correcting for wheel breakdown whereby the movement of workpieces is halted, the regulating wheel is retracted away from the series of workpieces and a first grinding position and then automatically advanced back toward the workpieces to be halted at a second grinding position determined by an adjustable stop avoids all the unpredictable effects of static friction in positioning the regulating wheel and permits the correction of throughfeed grinding position to within 20 to 30 millionths of an inch. Precision wheel breakdown correction with such accuracy, convenience and reliability was impossible in throughfeed grinding using previous conventional manual methods of adjustment.

It will be understood that various changes in the details, materials, steps and arrangements of parts which have been herein described and illustrated in order to explain the nature of the invention may be made by those skilled in the art within the principle and scope of the invention as expressed in the appended claims.

We claim:

1. Throughfeed control apparatus for a grinding machine having a regulating wheel movable to bring a moving series of workpieces and a grinding wheel into grinding contact, and driving means for moving said regulating wheel, comprising adjustable switch actuating means and switch means for producing signals to control said driving means, means for retracting the regulating wheel away from the series of workpieces and a first grinding position, means for advancing the regulating wheel automatically back toward the series of workpieces, means for halting the regulating wheel at a second grinding position determined by the adjustment of the switch actuating means, and means for halting the movement of the series of workpieces while the regulating wheel is retracted away from said workpieces.

2. Throughfeed control apparatus for a grinding machine having a regulating wheel movable to bring a moving series of workpieces and a grinding wheel into grinding contact, and driving means for moving said regulating wheel, comprising adjustable switch actuating means and switch means for producing signals to control said driving means, means for retracting the regulating wheel away from the series of workpieces and a first grinding position, means responsive to the retraction of the regulating wheel for advancing the regulating wheel automatically back toward the series of workpieces, means for halting the regulating wheel at a second grinding position determined by the adjustment of the switch actuating means, and means for halting the movement of the series of workpieces while the regulating wheel is retracted away from said workpieces.

References Cited

UNITED STATES PATENTS

| | | | |
|---|---|---|---|
| 1,891,661 | 12/1932 | Booth et al. | 51—165 X |
| 2,042,257 | 5/1936 | Harrison et al. | 51—165 X |
| 2,921,414 | 1/1960 | Garberding | 51—103 |
| 2,956,378 | 10/1960 | Arlin | 51—103 X |
| 2,963,832 | 12/1960 | Ohringer | 51—103 X |

LESTER M. SWINGLE, *Primary Examiner.*